(12) United States Patent
Beckner

(10) Patent No.: US 7,391,362 B2
(45) Date of Patent: Jun. 24, 2008

(54) LINEAR FM RADAR

(75) Inventor: Frederick L. Beckner, Palo Alto, CA (US)

(73) Assignee: Land Ray Technology, Inc., San Francisco, CA (US)

(*) Notice: Subject to any disclaimer, the term of this patent is extended or adjusted under 35 U.S.C. 154(b) by 0 days.

(21) Appl. No.: 11/699,289

(22) Filed: Jan. 29, 2007

(65) Prior Publication Data

US 2007/0132630 A1   Jun. 14, 2007

Related U.S. Application Data

(63) Continuation of application No. 11/298,203, filed on Dec. 10, 2005, now Pat. No. 7,170,440.

(51) Int. Cl.
*G01S 13/89* (2006.01)
*G01S 13/34* (2006.01)
*G01S 13/26* (2006.01)
*G01S 13/00* (2006.01)
*G01S 7/40* (2006.01)
*A61B 6/03* (2006.01)

(52) U.S. Cl. ............... 342/179; 342/22; 342/118; 342/128; 342/134; 342/135; 342/165; 342/173; 342/174; 342/175; 342/176; 342/194; 342/195; 342/196; 343/757

(58) Field of Classification Search .......... 342/22, 342/25 R–25 F, 52, 58, 60, 73–81, 118, 128–133, 342/165–176, 179, 194–197, 428–449, 134–144; 343/703, 720, 757–766, 793–824, 893; 382/128, 382/131
See application file for complete search history.

(56) References Cited

U.S. PATENT DOCUMENTS

| 3,465,342 | A |   | 9/1969  | Delapalme            |
|-----------|---|---|---------|----------------------|
| 4,484,194 | A | * | 11/1984 | Arvidsson ...... 342/174 |
| 4,635,065 | A |   | 1/1987  | Mori et al.          |
| 4,812,849 | A | * | 3/1989  | Otto ............ 342/194 |
| 4,924,229 | A | * | 5/1990  | Eichel et al. ...... 342/25 E |
| 4,924,232 | A | * | 5/1990  | Hudson et al. ..... 342/174 |
| 5,003,314 | A | * | 3/1991  | Berkowitz et al. .. 342/174 |
| 5,070,336 | A | * | 12/1991 | Pringle .......... 342/174 |
| 5,608,404 | A |   | 3/1997  | Burns et al.         |
| 5,627,543 | A | * | 5/1997  | Moreira .......... 342/25 A |
| 6,028,563 | A |   | 2/2000  | Higgins              |
| 6,121,917 | A |   | 9/2000  | Yamada               |
| 6,445,339 | B1 |  | 9/2002  | Yamada               |

(Continued)

*Primary Examiner*—Bernarr E Gregory
(74) *Attorney, Agent, or Firm*—Robert Charles Hill

(57) ABSTRACT

A FM-CW radar system comprises a frequency modulated continuous wave digital generator that produces both in-phase (I) and quadrature-phase (Q) outputs to orthogonally oriented transmitter antennas. A linearly polarized beam is output from a switched antenna array that allows a variety of I-and-Q pairs of bowtie antennas to be alternately connected to the transmitter and receiver. The receiver inputs I-and-Q signals from another bowtie antenna in the array and mixes these with samples from the transmitter. Such synchronous detection produces I-and-Q beat frequency products that are sampled by dual analog-to-digital converters (ADC's). The digital samples receive four kinds of compensation, including frequency-and-phase, wiring delay, and fast Fourier transform (FFT). The compensated samples are then digitally converted by an FFT-unit into time-domain signals. Such can then be processed conventionally for range information to the target that has returned the FM-CW echo signal.

6 Claims, 4 Drawing Sheets

U.S. PATENT DOCUMENTS 6,670,907 B2 * 12/2003 Cho .......................... 342/25 R
7,064,702 B1 * 6/2006 Abatzoglou ............... 342/25 F
7,068,216 B2 * 6/2006 Kliewer et al. .............. 342/174
7,158,076 B2 * 1/2007 Fiore et al. ................... 342/174
7,170,440 B1 * 1/2007 Beckner ...................... 342/22
7,212,152 B2 * 5/2007 Nagasaku ................... 342/174

* cited by examiner

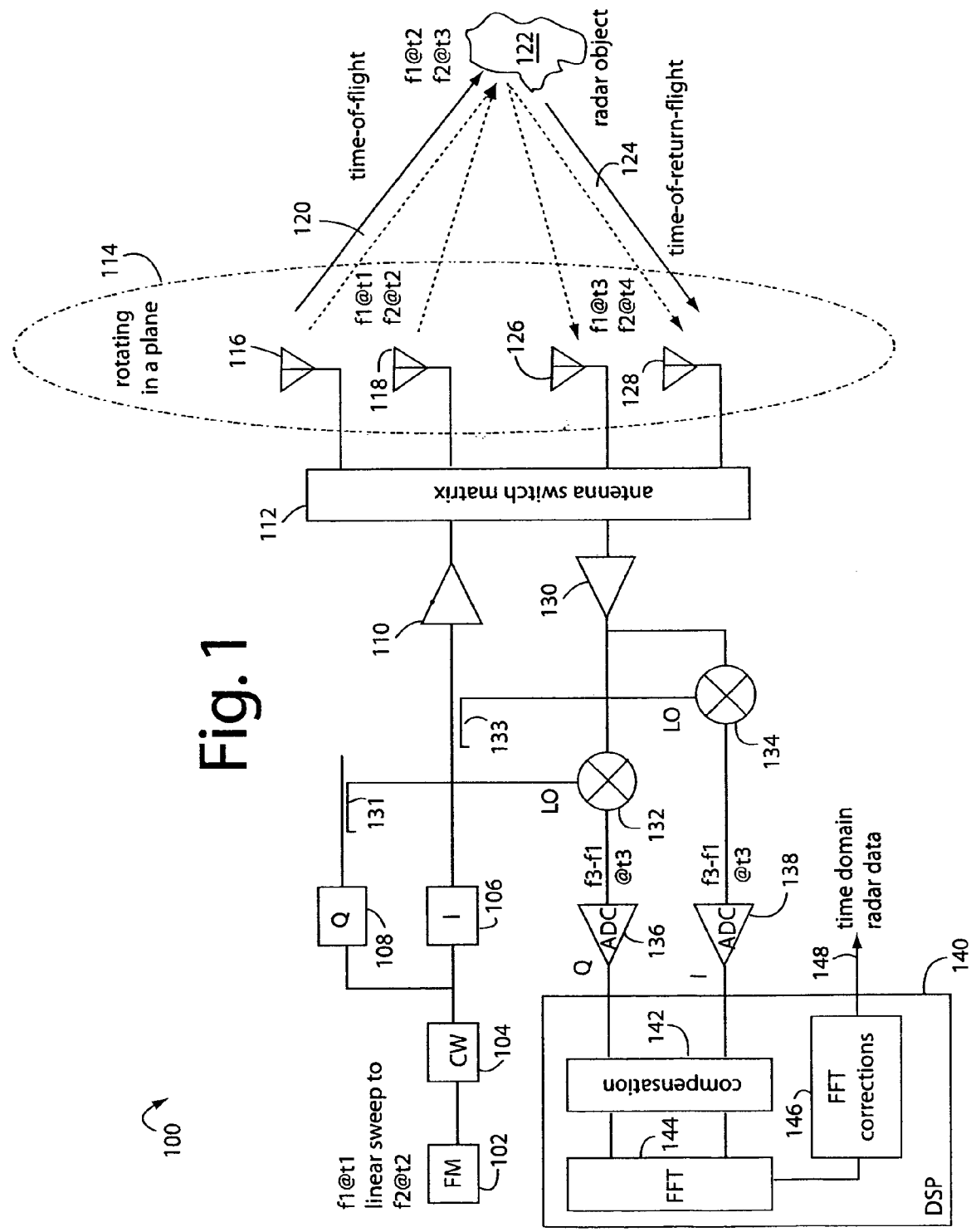

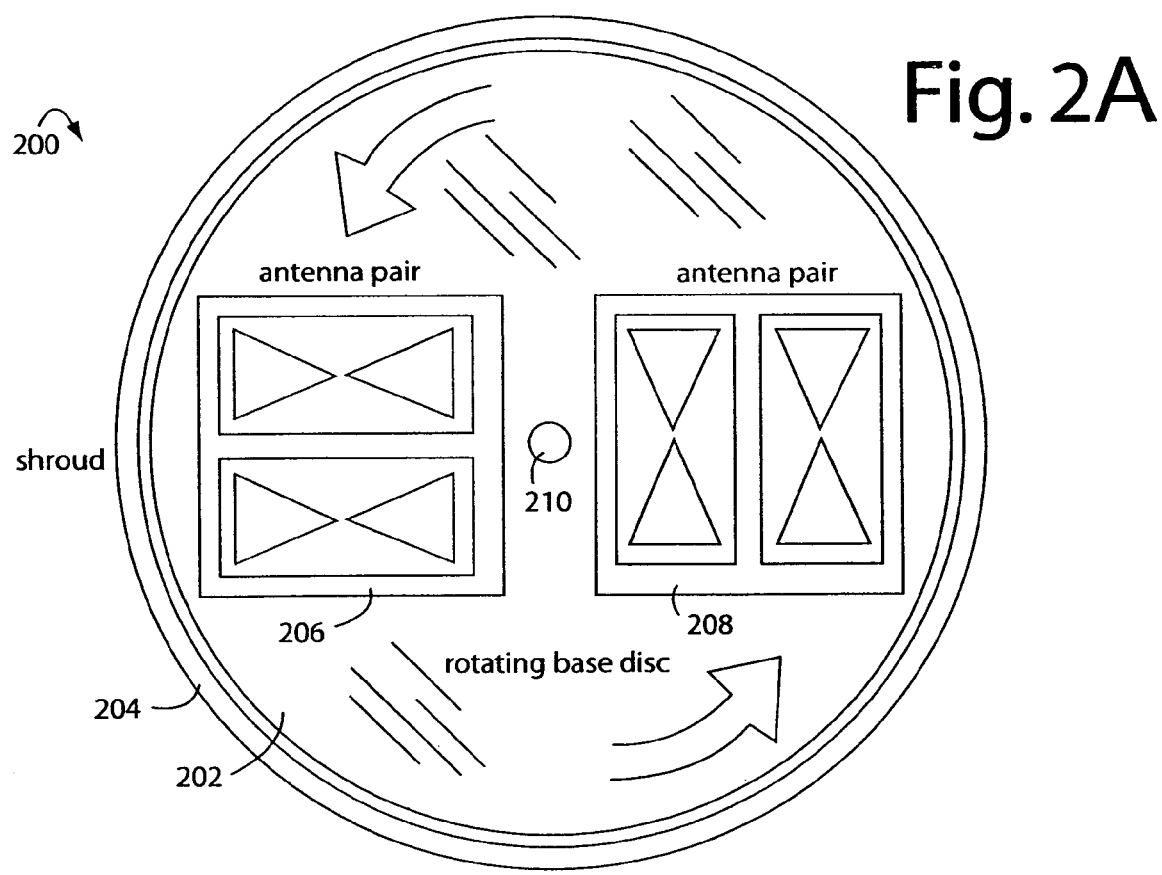

LINEAR FM RADAR

This application is a continuation of U.S. patent application Ser. No. 11/298,203 filed Dec. 10, 2005, now U.S. Pat. No. 7,170,440.

BACKGROUND OF THE INVENTION

1. Field of the Invention

The present invention relates to radar and ground penetrating radar imaging methods, and more particularly to radars that linearly sweep through frequencies and synchronously detect return signals affected by time-of-flight delays to target objects.

2. Description of Related Art

Frequency modulated (FM) continuous wave (CW) radars transmit a sweep frequency that is mixed with a return echo to produce a beat frequency. The beat frequency output from the mixer is a function of both how fast the CW output is sweeping in frequency and how far the return echo had to travel from the transmitter to the target and back to the receiver. A faster FM sweep of the CW signal increases the scale of the beat frequency product. Given a linear sweep, e.g., a sawtooth, and a fixed distance to the radar target, then the beat frequency will be a steady tone. The bandwidth of that tone determines the resolution of the radar.

The beat frequency tone represents the range of the target in the frequency domain. Traditional radars launch radio frequency (RF) pulses that are delayed in their echo returns in time by how far they had to fly out and back. So traditional radars produce range signals in the time domain. A fast Fourier transform (FFT) is typically used to convert FM-CW radar frequency-domain range signals to time-domain range signals so they can be conventionally processed.

Yukinori Yamada describes an FM-CW radar in U.S. Pat. No. 6,121,917, issued Sep. 19, 2000. An array antenna, beat signals, and Fourier transform process are used to Fourier transform data from each beam angle. Such radar determines the range to an object near the antenna array.

Yukinori Yamada describes another FM-CW radar apparatus in U.S. Pat. No. 6,445,339 B1, issued Sep. 3, 2002. The transmitted signal used is a frequency modulated continuous wave. A beat signal is generated from mixing transmitted and received signals, and this is the A/D converted. A switch is used to select various antenna elements in an array. A digital signal processor executes a digital beam-forming operation to detect the target from the beat signals.

The phase delays imparted by electronic FFT devices are not constant and vary with frequency. In order to get a accurate conversion between the frequency and time domains, the FFT output needs to be appropriately phase compensated. But to do this, the frequency of the signal being processed must be known to apply the appropriate correction. In FM-radar, the frequency of the return echo signal is unpredictable because it depends on the unknown range to the target. Prior art has neither recognized this source of error nor have there been any solutions proposed in conventional radar implementations.

SUMMARY OF THE INVENTION

Briefly, a FM-CW radar system embodiment of the present invention comprises a frequency modulated continuous wave digital signal generator that produces both in-phase (I) and quadrature-phase (Q) outputs, two pairs of bowtie transmit and receive antennas orthogonally placed on a rotating platform, an antenna switch matrix for routing the transmit signal from the digital signal generator to the desired transmit antenna and for routing the output of the desired receive antenna to the radar receiver input. A dual channel radar receiver is provided which mixes the received signal synchronously with the I and Q outputs from the digital signal generator. Such synchronous detection produces I-and-Q beat frequency products that are sampled by dual analog-to-digital converters (ADC's). These digital samples receive four kinds of compensation, including dynamic frequency-and-phase, static wiring delay, and novel fast Fourier transform (FFT) filter phase corrections. The digital samples are then converted by an FFT-unit into precise coherent time-domain signals. Such coherent time domain signals taken at fine sample intervals over the surface of the ground can then be processed by conventional back projection techniques to yield 3-dimensional images of the underground structures that returned the FM-CW echo signal.

By a combination of the linear motion of the radar antenna platform rotation axis along the ground and the rotary motion of the antennas about this axis a very fine sampling of radar echo data in the X-Y plane is obtained at sample spacings much less than the antenna size can be rapidly obtained over a considerable swath width for both orthogonal polarizations.

An advantage of the present invention is that a digital linear-FM ground-penetrating radar is provided that is less bulky, easier to maneuver, and provides finer radar details compared to multi-antenna fixed arrays.

Another advantage of the present invention is that a means is provided that can collect radar data at intervals smaller than the size of the antenna both along and perpendicular to the direction of motion of the radar along the ground because the radar antenna is also moved in a circle.

A further advantage of the present invention is that a digital linear-FM ground-penetrating radar is provided that can provide sharp 3-D subsurface images over a substantial swath width in a single pass of the radar.

A still further advantage of the present invention is that the digital linear-FM ground-penetrating radar is produces higher spatial resolution images due to the set of phase and amplitude compensations that are applied.

Another advantage of the present invention is that a digital linear-FM ground-penetrating radar is provided that is more efficient and has lower power consumption due to digitizing the radar data in the frequency domain rather than the time domain.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is a functional block diagram of an FM-CW radar system embodiment of the present invention shown transmitting a signal that is reflected back by a radar target;

FIG. 2A is a bottom-view diagram of a rotating antenna array disc with switchable transmitting and receiving bowtie antenna pairs that are rotated in a plane, e.g., parallel to the ground surface in an earth-penetrating radar application;

DETAILED DESCRIPTION OF THE INVENTION

Figure 2B:
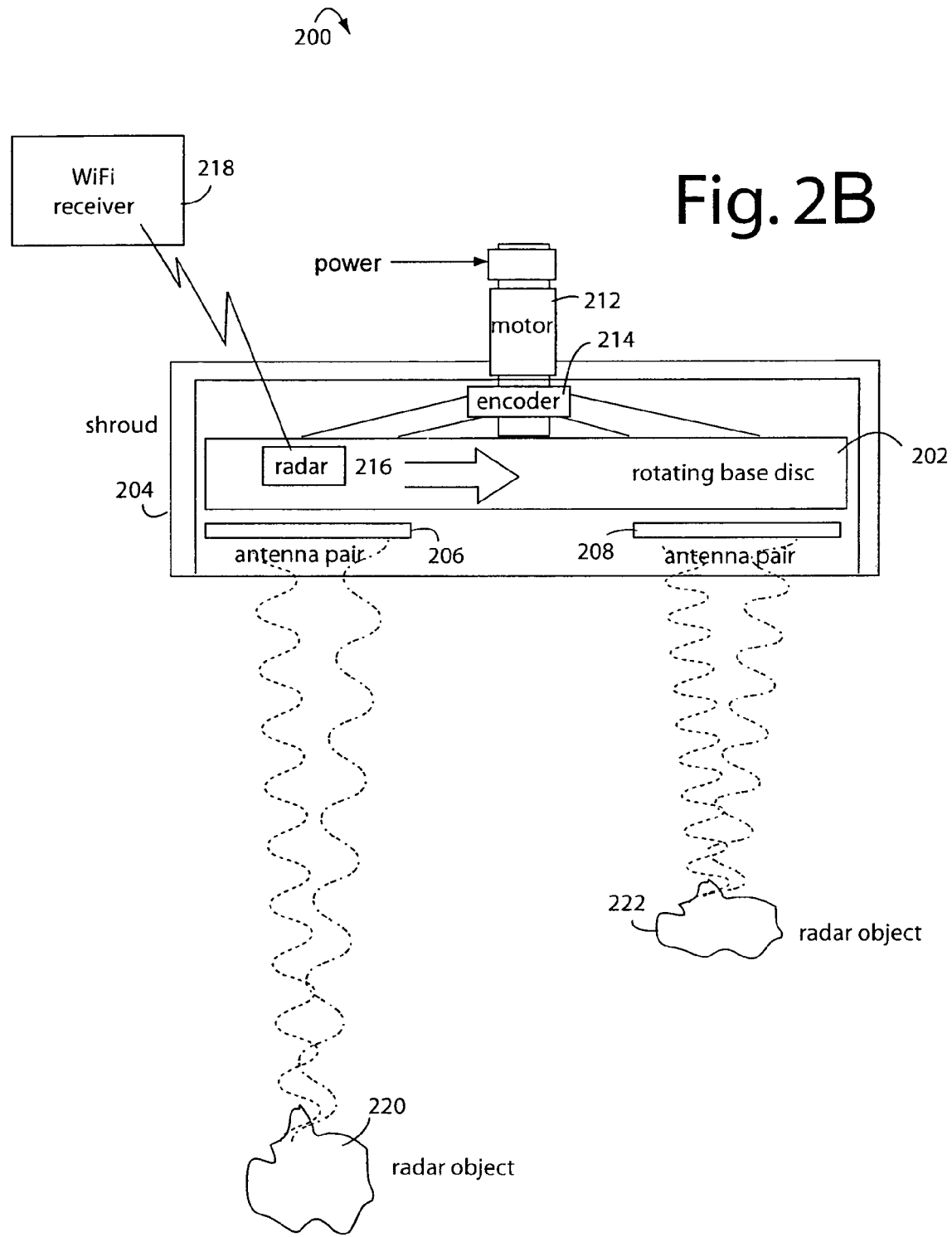
FIG. 2B is a side-view diagram of the rotating antenna array disc of FIG. 2A, as it is mounted inside a radar-absorbing shroud and rotated by an axle motor.

FIG. 1 illustrates an FM-CW radar system embodiment of the present invention, and is referred to herein by the general reference numeral 100. The radar system 100 comprises a frequency modulator (FM) 102 that causes a continuous wave (CW) generator 104 to linearly sweep through a band of frequencies. For example, at a time-1 (t1) the transmitter frequency from CW generator 104 will be frequency-1 (f1). At a time-2 (t2), the transmitter frequency will slew up to a frequency-2 (f2). And at a time-3 (t3), the transmitter frequency will slew further to a frequency-3 (f3). An in-phase (I) unit 106 digitally produces an I-signal, and a quadrature-phase (Q) unit 108 digitally produces a Q-signal 90-degrees shifted in phase. The I-signal is amplified by a power amplifier 110 before being selectively switched through an antenna matrix 112 to a rotating antenna array 114.

The rotating antenna array 114 allows, e.g., transmitting antennas 116 and 118, to radiate their signals from many finely separated positions in a plane of space. Radar targets of interest are approached normal to the plane of rotation. Radar data collected from each spatial position visited by the antennas allows for very high resolution three-dimensional radar images to be topographically computed. The three-dimensional spatial locations of each antenna at the times the signals are transmitted and received are reported and/or computed using conventional techniques, e.g., dead-reckoning, shaft encoders, LIDAR, GPS, etc. These positions are associated and correlated with the radar signals for tomography.

The transmitting antennas 116 and 118 produce a linearly polarized transmission signal 120 that is directed toward a radar target 122. FIG. 1 arbitrarily assumes that the time-of-flight propagation delay of transmission signal 114 will delay its arrival at radar target 116 until time t2. By time t2, the transmitter signal being output by FM 102 and CW 104 will have swept to frequency f2. And, by time t3, the transmitter signal being output by FM 102 and CW 104 will have swept to frequency f3.

The return flight of an echo signal 124 will experience a similar propagation time delay. So it will not arrive as frequency fl until a time t3 at a pair of receiving antennas 126 and 128. After being selected by matrix 112, the received signals are amplified by a low-noise amplifier (LNA) 130. A Q-sampler 131 provides a quadrature local oscillator (LO) demodulation reference for a Q-mixer 132. An I-sampler 133 provides an in-phase local oscillator (LO) demodulation reference for an I-mixer 134. These analog signals are digitally sampled by analog-to-digital converters (ADC) 136 and 138.

Each of the mixers 132 and 134 produces a beat tone that represents the difference in frequencies between the outgoing signal 120 and the return echo 124. The frequency of the beat tone depends on the distance to radar object 122. Minor cable, device, and wiring delays are ignored here, but in practice are compensated or nulled out.

Since it is the beat products from the mixers 132 and 134 that represent useful data, the range of frequencies are quite modest that must be converted by ADC's 136 and 138. In practical implementations, 14-bit binary ADC's are very affordable and perform very well. The digital outputs are connected to provide data to a digital signal processor (DSP) 140.

Software within the DSP 140 is used to implement a compensation function 142, fast Fourier transformation 144, and FFT corrections process 146. As a result, a time-domain radar output 148 provides range data for the radar object 116. Basically, the higher the beat tone, the farther away is the radar object 116. This has to be converted into a complex time pulse with a phase that is proportional to the distance to the radar object 122.

FIG. 2A represents a radar system 200 with a rotating antenna array disc 202 nested within a radar-absorbing shroud 204. A motor turns the disc 202 within the shroud 204, the direction of rotation is unimportant. Switchable transmitting and receiving bowtie antenna pairs 206 and 208 are rotated on an axis 210 in a plane, e.g., parallel to the ground surface in an earth-penetrating radar application. The bowtie antenna pairs 206 and 208 correspond to antennas 116, 118, 126, and 128, in FIG. 1. The whole assembly can be carried along a path while the antennas are rotating. An ideal combination of path speed, rotational speed, and frequency of radar transmissions can result in many measurement points individually separated by less than an inch in space.

In a prototype embodiment that was built, the antenna array disc 202 was forty inches (40") in diameter. Each antenna pair 206 and 208 was in a field 15" square, with each bowtie element being about 5-¾" by 12". Matching bowtie elements were separated by 8". A radar box and computer box were mounted to ride along with the antennas on the disc. Such simplified wiring. These used WiFi transmissions to communicate measurements over a wireless network to a local computer. The images were rendered on the computer. Operating power was supplied through slip rings.

FIG. 2B shows radar system 200 from the side with antenna array disc 202 rotating horizontally and normal to the page. The radar-absorbing shroud 204 protects the antennas from emitting or receiving spurious signals from the sides or top. A motor 212 turns the disc 202 within the shroud 204, and can be attached to stationary objects to scan moving targets, or moving objects to scan stationary and moving targets, e.g., a tripod, a wall, a gateway, a roadway, a boom arm, an aircraft, a vehicle, a crane, etc. An encoder 214 reports the shaft angle of axis 210.

A radar unit 216 rides along on disc 202 with antennas 206 and 208. It wirelessly communicates its measurements to a WiFi receiver 218. For example, a pair of radar targets 220 and 222 echo signals back, and their relative locations are measured by radar unit 216. Over time, many such measurements can be collected as the disc rotates and the geometries change to allow different perspectives. The otherwise one-dimension measurements of the radar echo returns can then be used to paint a high-resolution three-dimensional picture as the antenna positions are correlated to the measurements obtained.

Referring again to FIG. 1, the FFT corrections process 146 runs within DSP 140. The various frequency and phase errors that are caused by the physical implementations of the transmitter, antennas, and receiver are nulled out by the compensation function 142. But, the FFT 144 injects phase errors that are a function of the input frequency, e.g., the beat tone. Since the beat tone is of an unknown frequency and dynamic, it cannot be simply indexed to find an appropriate FFT phase error correction factor.

It has been observed in experiments that the FFT phase errors are substantial and the time-domain radar output 148 will be grossly inaccurate if such errors are not corrected. The FM-CW radar system 100 effectively produces a steady beat tone as the FM sweep progresses over the sweep bandwidth if the antenna-target geometry is unchanging. All the samples taken by the ADC's 136 and 138 can be effectively averaged to arrive at a high confidence range estimate. But these samples will not vector-add in a single consistent direction if each sample is later adversely affected by differing FFT phase-error injections in FFT 144.

Figure 3:
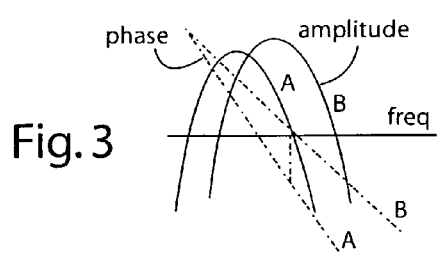
FIG. 3 represents the different phase and amplitude responses of FFT filters at various frequencies measured by the FM-CW radar system of FIG. 1.

FIG. 3 represents the phase and amplitude responses of two FFT filters, A and B, by frequency. The phase and amplitude responses of the FFT filters is different at each frequency point.

Figure 4:
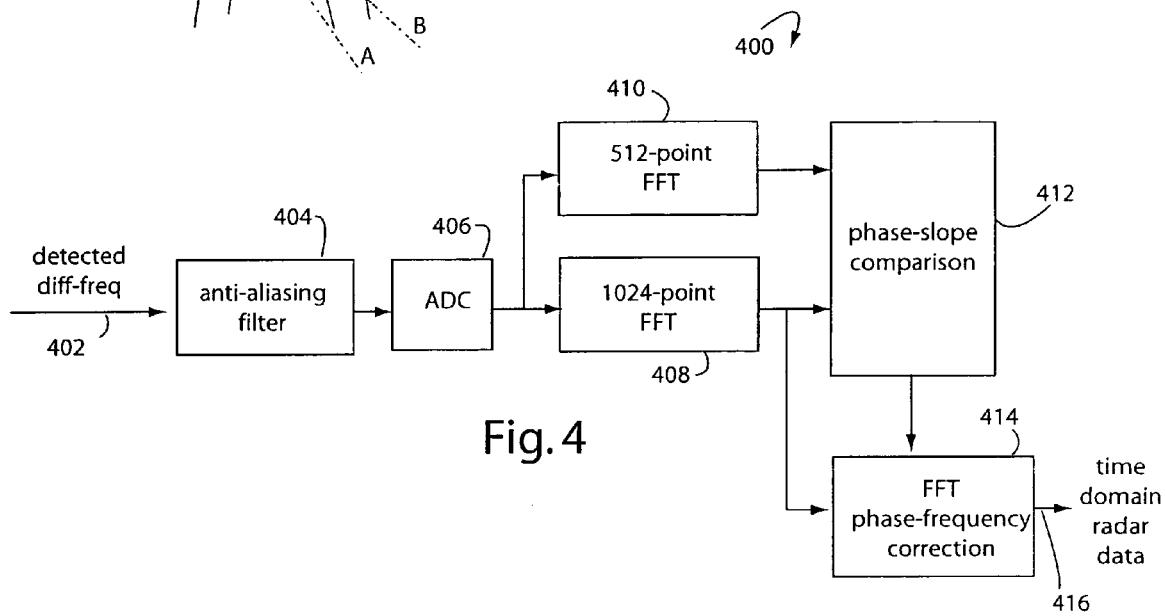
FIG. 4 is a functional block diagram of a first method for correcting FFT phase errors that uses two different size FFT's with different phase slopes.

FIG. 4 represents a first method for compensating the phase errors caused by the FFT. A subsystem 400 inputs the detected difference frequencies 402 from the mixer into an anti-aliasing filter 404. Such filter is essentially a low-pass filter with a very sharp cut-off frequency. An analog-to-digital converter converts these signals into analog form.

In one embodiment of the present invention that was built as a prototype and demonstration unit, a digital linear-FM core technology module (CTM) was implemented as the central element in at least two commercial ground-penetrating radar products, e.g., a handheld field locator, and a vehicle-mounted road survey unit. The CTM uses direct digital synthesis radio-frequency (RF) technology to generate linear frequency modulated (linear-FM) radar waveforms. It integrated all the functions necessary to interface between a digital computer and the analog signals of the radar transmitter and receiver. The CTM included a direct digital synthesizer (DDS) for generating in-phase and quadrature linear-FM waveforms. Twin programmable anti-aliasing filters and 14-bit analog-to-digital converters convert the output of the radar receiver into digital form which is directly stored in the memory of a powerful digital signal processor (DSP). The CTM interfaces the DSP chip to a digital computer via a high-speed parallel bus. Such allows downloading of the DSP operating program and operating commands, and uploading of any processed radar data.

The DSP signal processing transforms frequency-domain linear-FM video data into a series of time-domain echo samples ready for 3-D image formation. The DSP accepts raw radar data from the analog-to-digital converters, subtracts any internal clutter, applies phase and amplitude weighting to the video data, and applies a Fourier transform to produce the output data samples.

The CTM includes power management circuitry to minimize power consumption operation in remote locations using battery power. The CTM is essentially digital and therefore easily manufacturable using conventional surface mount manufacturing techniques. Testing can then be done without special test equipment, e.g., the CTM has no potentiometers or other components requiring manual adjustment.

Such digital linear-FM (DLFM) radar technology has major advantages over swept frequency and the commercially more common impulse-based radars. For example, an improved ability to see small objects in the presence of large objects, improved detection of targets/objects from which a low signal is received and must compete with internal radar-receiver-noise, sharper images with fewer signal processing steps, lower power consumption, programmable to deliver specific image and map data needs, greater reliability of operation, compliance with existing FCC Part 15 rules for unlicensed operation, more thorough rejection of internal clutter signals, reduced interference to and from other systems sharing the spectrum, and better resistance to image distortion and positioning errors that result from antenna ringing effects.

A major advantage of DLFM radar technology is that it allows precise control over the shape of the radiated spectrum as a function of frequency. This precise control of spectrum shape translates into the improved detection of low signal-to-noise underground objects and the inherent ability to conform to present FCC Part 15 regulations.

The improved detection of low signal-to-noise ratio underground objects results because the linear-FM waveform can arbitrarily shape its transmitted signal strength as a function of frequency. In the simplest case, a linear-FM system transmits the same power at each frequency within its operating band. The flat spectrum of the transmitted signal matches the flat spectrum of receiver noise, and so the signal-to-noise of each spectral component is the same.

In impulse radar, the spectrum of the transmitted signal is not flat, and the signal-to-noise ratio of each spectral component varies with frequency, having a maximum at some center frequency and falling on either side of this frequency. This means that given the same transmitted energy the effective signal-to-noise ratio of a linear-FM radar will be greater than that of an impulse radar. This also means that the effective bandwidth of the received signal depends on its signal-to-noise ratio. At low signal-to-noise ratios, the radar range resolution of an impulse radar degrades relative to that of a linear-FM radar.

The spectrum of an impulse radar is determined by the Fourier transform of the shape of the transmitted impulse, so impulse radars radiate significant energy over a very wide. bandwidth. Such energy decreases very little in strength from the center frequency. There is no sharp cutoff in the spectrum of radiated energy. The only way to limit the radiated energy above an arbitrary frequency, such as mandated by FCC regulations, is to either lower the impulse center frequency or to pass the impulse signal through a sharp cutoff low-pass filter. The first reduces the range resolution, and the second degrades the range resolution and distorts the transmitted waveform.

A linear-FM radar intrinsically has a very sharp cutoff in radiated power outside its operating band, and full power operation at all frequencies within this band. It is thus simultaneously capable of operating very close to a specific cutoff frequency with minimum radiation in a restricted region above this frequency, and produces a better range resolution than an impulse radar operating under restrictions.

The radar signals radiated by a linear-FM radar are narrowband waveforms which linearly chirp over a given frequency range rather than radiating all frequencies at the same instant of time. This allows a reduction in the required analog-to-digital conversion rate by a factor of approximately one thousand, relative to that required by an impulse radar. Such translates into lower hardware costs, lower system power consumption, an improved ability to see weak echoes in the presence of strong ones, and sharper images with fewer required signal processing computations.

In a linear-FM system, the received radar echo signals are mixed with a sample of the transmitted signal for synchronous detection. The mixer output is filtered so that only the difference-frequency signals remain. A radar scatterer at a fixed range will be seen as a relatively long duration fixed-frequency sinewave signal, and the difference frequency is proportional to radar range. The minimum sample rates needed are reduced by the range window width divided by the sweep duration and the velocity of propagation. For a linear-FM radar with a 50-ft range window, and a sweep duration of 500-microseconds, such minimum is reduced about 3,920:1.

An impulse radar with an upper frequency cutoff of 960 MHz requires analog-to-digital conversion rate greater than 1,920 MHz. A linear-FM radar operating with the same range resolution requires an analog-to-digital conversion rate of 0.49 MHz. The impulse radar digitizes at an extremely high rate for a very short time, e.g., 100-nanoseconds. The linear-FM radar digitizes at a much lower rate and over a relatively longer time. A low repetition rate avoids interference from multiple-time-around echoes. So linear-FM radar uses this time to significantly reduce the required analog-to-digital conversion rate.

Reducing the analog-to-digital rate simplifies the radar hardware since it no longer has to be good enough to input data samples at a gigahertz rate. Reduced performance demands lower the cost and power consumption of the radar/computer interface hardware. The lower analog-to-digital rate also means that analog-to-digital conversion can be done with much greater precision. Such converters able to operate at gigahertz rates typically have only 8-bit precision. A 14-bit converter can be used a linear-FM system, and has about 36-dB more dynamic range.

Referring now to FIG. 4, the FFT contributed phase error can be corrected even when the input frequency is not known before hand. The phase error responses of FFT filters with different numbers of points but connected to the same input signals can be compared to discover the input frequency they have both processed. FIG. 3 shows the two different phase responses, A and B, of different multi-point FFT filters. At any one frequency, the difference between the two phase slopes will be unique. Such difference can be used in the inverse to discover the input frequency. The phase contributed error of the FFT to the time-domain output signal can thereafter be subtracted out.

A first FFT phase error correction circuit 400 inputs a detected difference frequency 402, e.g., from one of the mixers 130 or 134 (FIG. 1). An anti-aliasing filter 404 is a low pass filter that cuts off the highest frequencies to be converted by an ADC 406. A 1024-point FFT filter 408 is paralleled with a 512-point FFT filter 410. This is only an example of the different FFT filters that can be paralleled. The objective is to parallel two different FFT filters that will exhibit a difference in their phase responses over the range of frequencies passed by anti-aliasing filter 404. A phase-slope comparator 412 reads the differences in the outs of FFT's 408 and 410, and assumes that both processed the same frequency input. So any difference in the FFT outputs is attributed to the respective differences in phase error. Such can be used in a calculation to discern what must be the input frequency to both FFT's. An FFT phase-frequency correction unit 414 corrects the output of the 1024-point FFT filter 408 according to the processing-frequency determined by the phase-slope comparator 412. A corrected time-domain radar output 416 can then be used in conventional ground penetrating radar imaging tomography to visually display objects buried in the ground.

Figure 5:
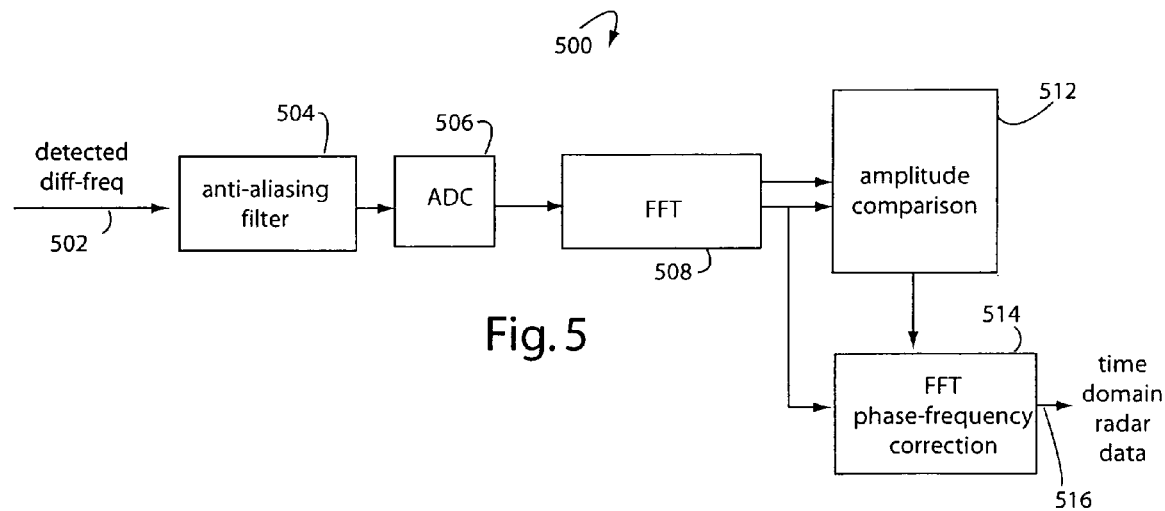
FIG. 5 is a functional block diagram of a second method for correcting FFT phase errors that compares the amplitude responses of two adjacent FFT filters.

Referring now to FIG. 5, the FFT contributed phase error can also be corrected with a less processor intensive method than that of FIG. 4. The results obtained with that shown in FIG. 5 are quite good, given the resources demanded. The amplitude responses of adjacent FFT filters can be compared to discover the input frequency they have both processed. A lookup table is constructed that relates the amplitude difference to the center frequency of each adjacent FFT filter. FIG. 3 shows the two different amplitude responses, A and B, of adjacent FFT filters. A line is drawn between the peaks of each, and the slope of this line will reveal the input frequency from a lookup table.

A second FFT phase error correction circuit 500 inputs a detected difference frequency 502, e.g., from one of the mixers 130 or 134 (FIG. 1).

An anti-aliasing filter 504 is a low pass filter that cuts off the highest frequencies to be converted by an ADC 506. A 1024-point FFT filter 508 is used for amplitude measurements, it will exhibit a difference in its phase responses over the range of frequencies passed by anti-aliasing filter 504. A phase-slope comparator 512 reads the differences in the outputs of FFT 508. Any difference in the FFT's outputs is attributed to the respective differences in phase error. Such can be used in a calculation to discern what must be the input frequency. An FFT phase-frequency correction unit 514 corrects the output of the 1024-point FFT filter 508 according to the processing-frequency determined by the phase-slope comparator 512. A corrected time-domain radar output 516 can then be used in conventional ground penetrating radar imaging tomography to visually display objects buried in the ground.

In a linear-FM system, every analog-to-digital sample taken over the whole sweep contributes to the time-domain output signals. In impulse radar systems, each analog-to-digital sample contributes to only one time-domain output signal sample. If five-hundred analog-to-digital samples were taken, the dynamic range of the linear-FM system would be better by √500, or about 27-dB. The improved dynamic range provides for a more precise background subtraction so weak target information signals can be discerned in the presence of strong interfering signals. Sharper images can be realized with less signal processing because digital corrections can be made directly to the radar echo phase and amplitude data output by the analog-to-digital converter. Otherwise, an inverse Fourier transform would have to be made before such corrections could be applied. Such corrections compensate for system imperfections and provide higher range resolution and sharper radar images without having to digitally transform time-domain data into the frequency domain.

DLFM transmitted signals have a high degree repeatability because they are digitally generated. Such repeatability permits better rejection of stationary internal clutter signals and an improved visibility of underground targets. The amplitude of each waveform sample is digitally computed first, then digital-to-analog converted into an analog waveform. The waveform repeatability is thus that of the digital-to-analog converter. Demonstrations comparing one radar sweep against another sweep show the differences to be only one part in 3000, or about minus 70-dB. Such repeatability enables stationary internal clutter signal cancellation of about 70-dB.

Digital linear-FM radar embodiments of the present invention show reduced radio frequency interference to and from other systems sharing the same radio frequency spectrum. A typical million-to-one pulse compression ratio of DLFM radar reduces its susceptibility to interference from outside in-band signals by 60-dB. Such also reduces the generated interference in other electronic systems sharing the same spectrum by a similar amount. The DLFM narrowband radar receiver sweeps across a wide RF spectrum in a short time. An external, spurious signal would have to sweep at exactly the right rate to interfere with the DLFM receiver processing. Conversely, the frequency-sweeping, low-power transmitted signal of the DLFM transmitter delivers so very little energy into the passband of another device's receiver that little real signal power is seen by that receiver. It therefore will not typically be disturbed by the operation of a DLFM unit nearby.

Digital linear-FM radar implementations are more reliable because high peak power transmitted signals are not used. The generation of high peak power transmitted signals require high operating voltages. Such high voltages lead to equipment breakdowns and higher construction costs. The DLFM radar transmitters can operate with 12-volt car battery voltages, or even less voltage.

Digital linear-FM radar units are less susceptible to antenna ringing effects. The radiated time of each spectral component of the DLFM-waveform is relatively long compared to antenna ringing times, e.g., microseconds versus nanoseconds. So wideband antenna types can be used which would otherwise be inappropriate for use in impulse radar systems.

Digital linear-FM radars can be programmed to output many different types of waveforms. Different waveforms are useful in gathering specialized image and map data, and such help accommodate a wide range of terrain and soil conditions. Digital linear-FM radar embodiments of the present invention allow the operating program to be adjusted to trade-off image resolution for greater image depth when necessary. The power output can also be scaled to respond to soil characteristics. Impulse radars typically radiate only one type of waveform, and thus preclude a pre-survey adjustment of the probe signal for specific types of report signals.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A digital frequency-modulated radar system, comprising:
   a frequency-modulated transmitter to transmit a radar signal from a first antenna to a target;
   a receiver to receive any echo signal of said radar signal returned from said target;
   a mixer to produce a beat tone from the instantaneous difference in frequencies of said radar signal and said echo signal;
   an analog-to-digital converter (ADC) to digitally sample said beat tone;
   a fast Fourier transform (FFT) filter to process frequency-domain measurements from the ADC into time-domain radar data; and
   a corrector connected to the FFT and providing for a removal of phase errors from said time-domain radar data contributed by the FFT filter that are a function of the frequency of said beat tone.

2. The system of claim 1, further comprising:
   an m-point FFT filter to receive digital samples from the ADC;
   an n-point FFT filter to receive digital samples from the ADC in parallel with the m-point FFT filter;
   a comparator connected to an output of each of the m-point and n-point FFT filters and providing for a frequency estimate to said beat tone according to a difference in any FFT-output signals produced; and
   a compensator to receive said frequency estimate and providing for a correction to said time-domain radar data.

3. The system of claim 1, further comprising:
   a first FFT filter to receive digital samples from the ADC;
   a second FFT filter to receive digital samples from the ADC and adjacent with the first FFT filter,
   a comparator connected to an output of each of the first and second FFT filters and providing for a correction to said time-domain radar data based on a difference in the peak output amplitudes of each.

4. The system of claim 3, wherein:
   the comparator includes a lookup table that provides a correction factor for said time-domain radar data based on said difference in the peak output amplitudes of the first and second FFT filters.

5. A radar system, comprising:
   an antenna support disc (202) with an external face for revolving in a plane of rotation (114);
   at least one radar antenna (116,118) mounted flat to said external face for directing frequency-modulated radar transmissions (120) normal to said plane of rotation;
   a radar transmitter (102,104,106,108,110) providing frequency-modulated radar transmissions, and connected to such radar antenna (116,118);
   at least one radar antenna (126,128) mounted flat to said external face for receiving radar transmissions (124) normal to said plane of rotation;
   a radar receiver (130,132,134,136,138) connected to the radar antenna (126, 128);
   a radar processor (140,216,400,500) connected to the radar receiver, and providing for a calculation of radar echo range measurements (148) of target objects (122,220, 222) illuminated by the radar antenna; and
   a local computer (218) connected to the radar processor and receiving said range measurements for imaging of said target objects (122,222).

6. A radar system, comprising:
   an antenna support disc (202) with an external face for revolving in a plane of rotation (114);
   at least one radar antenna (116,118) mounted flat to said external face for directing linear impulse radar transmissions (120) normal to said plane of rotation;
   a radar transmitter (102,104,106,108,110) providing impulse radar transmissions, and connected to such radar antenna (116,118);
   at least one radar antenna (126,128) mounted flat to said external face for receiving radar transmissions (124) normal to said plane of rotation;
   a radar receiver (130,132,134,136,138) connected to the radar antenna (126,128);
   a radar processor (140,216,400,500) connected to the radar receiver; and providing for a calculation of radar echo range measurements (148) of target objects (122,220, 222) illuminated by the radar antenna; and
   a local computer (218) connected to the radar processor and receiving said range measurements for imaging of said target objects (122,222).

* * * * *